(12) United States Patent  
Hormati

(10) Patent No.: US 11,115,246 B2
(45) Date of Patent: Sep. 7, 2021

(54) SAMPLER OFFSET CALIBRATION DURING OPERATION

(71) Applicant: Kandou Labs SA, Lausanne (CH)

(72) Inventor: Ali Hormati, Ecublens Vaud (CH)

(73) Assignee: KANDOU LABS, S.A., Lausanne (CH)

(*) Notice: Subject to any disclaimer, the term of this patent is extended or adjusted under 35 U.S.C. 154(b) by 0 days.

(21) Appl. No.: 17/100,524

(22) Filed: Nov. 20, 2020

(65) Prior Publication Data

US 2021/0075652 A1   Mar. 11, 2021

Related U.S. Application Data

(63) Continuation of application No. 16/800,892, filed on Feb. 25, 2020, now Pat. No. 10,848,351, which is a continuation of application No. 16/378,450, filed on Apr. 8, 2019, now Pat. No. 10,574,487.

(51) Int. Cl.
*H04L 25/03* (2006.01)

(52) U.S. Cl.
CPC .. *H04L 25/03076* (2013.01); *H04L 25/03063* (2013.01); *H04L 2025/0349* (2013.01); *H04L 2025/03624* (2013.01)

(58) Field of Classification Search
CPC ......... H04L 25/03057; H04L 25/03267; H04L 25/03146; H04L 2025/0349; H04B 3/235
See application file for complete search history.

(56) References Cited

U.S. PATENT DOCUMENTS

| | | | |
|---|---|---|---|
| 3,636,463 A | 1/1972 | Ongkiehong | |
| 3,824,494 A | 7/1974 | Wilcox | |
| 3,939,468 A | 2/1976 | Mastin | |
| 3,992,616 A | 11/1976 | Acker | |
| 4,276,543 A | 6/1981 | Miller et al. | |

(Continued)

FOREIGN PATENT DOCUMENTS

| EP | 0425064 A2 | 5/1991 |
|---|---|---|
| KR | 0340178 B1 | 6/2002 |

(Continued)

OTHER PUBLICATIONS

Machine Translation of KR0340178B1, 1-8 (8 pages).

(Continued)

*Primary Examiner* — Kevin Kim

(74) *Attorney, Agent, or Firm* — Invention Mine LLC

(57) ABSTRACT

Methods and systems are described for sampling a data signal using a data sampler operating in a data signal processing path having a decision threshold associated with a decision feedback equalization (DFE) correction factor, measuring an eye opening of the data signal by adjusting a decision threshold of a spare sampler operating outside of the data signal processing path to determine a center-of-eye value for the decision threshold of the spare sampler, initializing the decision threshold of the spare sampler based on the center-of-eye value and the DFE correction factor, generating respective sets of phase-error signals for the spare sampler and the data sampler responsive to a detection of a predetermined data pattern, and updating the decision threshold of the data sampler based on an accumulation of differences in phase-error signals of the respective sets of phase-error signals.

20 Claims, 6 Drawing Sheets

(56) References Cited

U.S. PATENT DOCUMENTS

| | | |
|---|---|---|
| 4,774,498 A | 9/1988 | Traa |
| 4,897,657 A | 1/1990 | Brubaker |
| 5,017,924 A | 5/1991 | Guiberteau et al. |
| 5,459,465 A | 10/1995 | Kagey |
| 5,510,736 A | 4/1996 | Van |
| 5,748,948 A | 5/1998 | Yu et al. |
| 5,777,568 A | 7/1998 | Inoue |
| 5,793,254 A | 8/1998 | Oconnor |
| 5,945,935 A | 8/1999 | Kusumoto et al. |
| 6,094,075 A | 7/2000 | Garrett et al. |
| 6,226,330 B1 | 5/2001 | Mansur |
| 6,232,908 B1 | 5/2001 | Nakaigawa |
| 6,346,907 B1 | 2/2002 | Dacy et al. |
| 6,384,758 B1 | 5/2002 | Michalski et al. |
| 6,396,329 B1 | 5/2002 | Zerbe |
| 6,400,302 B1 | 6/2002 | Amazeen et al. |
| 6,462,584 B1 | 10/2002 | Proebsting |
| 6,563,382 B1 | 5/2003 | Yang |
| 6,624,699 B2 | 9/2003 | Yin et al. |
| 6,839,587 B2 | 1/2005 | Yonce |
| 6,879,816 B2 | 4/2005 | Bult et al. |
| 6,888,483 B2 | 5/2005 | Mulder |
| 6,972,701 B2 | 12/2005 | Jansson |
| 7,075,996 B2 | 7/2006 | Simon et al. |
| 7,167,523 B2 | 1/2007 | Mansur |
| 7,188,199 B2 | 3/2007 | Leung et al. |
| 7,199,728 B2 | 4/2007 | Dally et al. |
| 7,269,212 B1 | 9/2007 | Chau et al. |
| 7,285,977 B2 | 10/2007 | Kim |
| 7,339,990 B2 | 3/2008 | Hidaka |
| 7,372,295 B1 | 5/2008 | Wei |
| 7,372,390 B2 | 5/2008 | Yamada |
| 7,397,302 B2 | 7/2008 | Bardsley et al. |
| 7,528,758 B2 | 5/2009 | Ishii |
| 7,560,957 B2 | 7/2009 | Chen et al. |
| 7,635,990 B1 | 12/2009 | Ren et al. |
| 7,656,321 B2 | 2/2010 | Wang |
| 7,683,720 B1 | 3/2010 | Yehui et al. |
| 7,688,102 B2 | 3/2010 | Bae et al. |
| 7,697,915 B2 | 4/2010 | Behzad et al. |
| 7,804,361 B2 | 9/2010 | Lim et al. |
| 7,869,497 B2 | 1/2011 | Benvenuto et al. |
| 7,873,115 B2 | 1/2011 | Zerbe et al. |
| 7,957,472 B2 | 6/2011 | Wu et al. |
| 8,000,664 B2 | 8/2011 | Khorram |
| 8,030,999 B2 | 10/2011 | Chatterjee et al. |
| 8,074,126 B1 | 12/2011 | Qian et al. |
| 8,106,806 B2 | 1/2012 | Toyomura et al. |
| 8,159,375 B2 | 4/2012 | Abbasfar |
| 8,159,376 B2 | 4/2012 | Abbasfar |
| 8,183,930 B2 | 5/2012 | Kawakami et al. |
| 8,472,513 B2 | 6/2013 | Malipatil et al. |
| 8,537,886 B1 | 9/2013 | Shumarayev et al. |
| 8,547,272 B2 | 10/2013 | Nestler et al. |
| 8,581,824 B2 | 11/2013 | Baek et al. |
| 8,604,879 B2 | 12/2013 | Mourant et al. |
| 8,643,437 B2 | 2/2014 | Chiu et al. |
| 8,674,861 B2 | 3/2014 | Matsuno et al. |
| 8,687,968 B1 | 4/2014 | Nosaka et al. |
| 8,704,583 B2 | 4/2014 | Bulzacchelli et al. |
| 8,791,735 B1 | 7/2014 | Shibasaki |
| 8,841,936 B2 | 9/2014 | Nakamura |
| 8,860,590 B2 | 10/2014 | Yamagata et al. |
| 8,929,496 B2 | 1/2015 | Lee et al. |
| 9,069,995 B1 | 6/2015 | Cronie |
| 9,083,576 B1 | 7/2015 | Hormati |
| 9,100,232 B1 | 8/2015 | Hormati et al. |
| 9,106,465 B2 | 8/2015 | Walter |
| 9,148,087 B1 | 9/2015 | Tajalli |
| 9,178,503 B2 | 11/2015 | Hsieh |
| 9,281,785 B2 | 3/2016 | Sjöland |
| 9,292,716 B2 | 3/2016 | Winoto et al. |
| 9,300,503 B1 | 3/2016 | Holden et al. |
| 9,397,868 B1 | 7/2016 | Hossain et al. |
| 9,438,409 B1 | 9/2016 | Liao et al. |
| 9,520,883 B2 | 12/2016 | Shibasaki |
| 9,571,309 B1 | 2/2017 | Sakai |
| 9,755,599 B2 | 9/2017 | Yuan et al. |
| 10,003,315 B2 | 6/2018 | Tajalli |
| 10,193,716 B2 | 1/2019 | Hormati et al. |
| 10,326,623 B1 | 6/2019 | Tajalli |
| 2001/0006538 A1 | 7/2001 | Simon et al. |
| 2002/0050861 A1 | 5/2002 | Nguyen et al. |
| 2002/0149508 A1 | 10/2002 | Hamashita |
| 2002/0158789 A1 | 10/2002 | Yoshioka et al. |
| 2002/0174373 A1 | 11/2002 | Chang |
| 2003/0016763 A1 | 1/2003 | Doi et al. |
| 2003/0085763 A1 | 5/2003 | Schrodinger et al. |
| 2003/0132791 A1 | 7/2003 | Hsieh |
| 2003/0160749 A1 | 8/2003 | Tsuchi |
| 2003/0174023 A1 | 9/2003 | Miyasita |
| 2003/0184459 A1 | 10/2003 | Engl |
| 2003/0218558 A1 | 11/2003 | Mulder |
| 2004/0027185 A1 | 2/2004 | Fiedler |
| 2004/0169529 A1 | 9/2004 | Afghahi et al. |
| 2005/0008099 A1 | 1/2005 | Brown |
| 2005/0057379 A1 | 3/2005 | Jansson |
| 2005/0218980 A1 | 10/2005 | Kalb |
| 2005/0270098 A1 | 12/2005 | Zhang et al. |
| 2006/0036668 A1 | 2/2006 | Jaussi et al. |
| 2006/0097786 A1 | 5/2006 | Su et al. |
| 2006/0103463 A1 | 5/2006 | Lee et al. |
| 2006/0192598 A1 | 8/2006 | Baird et al. |
| 2006/0194598 A1 | 8/2006 | Kim et al. |
| 2006/0233291 A1 | 10/2006 | Garlepp et al. |
| 2007/0009018 A1 | 1/2007 | Wang |
| 2007/0097579 A1 | 5/2007 | Amamiya |
| 2007/0104299 A1 | 5/2007 | Cahn et al. |
| 2007/0159247 A1 | 7/2007 | Lee et al. |
| 2007/0176708 A1 | 8/2007 | Otsuka et al. |
| 2007/0182487 A1 | 8/2007 | Ozasa et al. |
| 2007/0188367 A1 | 8/2007 | Yamada |
| 2007/0201546 A1 | 8/2007 | Lee |
| 2007/0285156 A1 | 12/2007 | Roberts et al. |
| 2008/0001626 A1 | 1/2008 | Bae et al. |
| 2008/0069198 A1 | 3/2008 | Bhoja et al. |
| 2008/0107209 A1 | 5/2008 | Cheng et al. |
| 2008/0165841 A1 | 7/2008 | Wall et al. |
| 2008/0187037 A1 | 8/2008 | Bulzacchelli et al. |
| 2009/0090333 A1 | 4/2009 | Spadafora et al. |
| 2009/0115523 A1 | 5/2009 | Akizuki et al. |
| 2009/0146719 A1 | 6/2009 | Pernia et al. |
| 2009/0323864 A1 | 12/2009 | Tired |
| 2010/0020862 A1 | 1/2010 | Peng |
| 2010/0148819 A1 | 6/2010 | Bae et al. |
| 2010/0156691 A1 | 6/2010 | Taft |
| 2010/0219781 A1 | 9/2010 | Kuwamura |
| 2010/0235673 A1 | 9/2010 | Abbasfar |
| 2010/0271107 A1 | 10/2010 | Tran et al. |
| 2011/0028089 A1 | 2/2011 | Komori |
| 2011/0032977 A1 | 2/2011 | Hsiao et al. |
| 2011/0051854 A1 | 3/2011 | Kizer et al. |
| 2011/0057727 A1 | 3/2011 | Cranford et al. |
| 2011/0096054 A1 | 4/2011 | Cho et al. |
| 2011/0103508 A1 | 5/2011 | Mu et al. |
| 2011/0133816 A1 | 6/2011 | Wu et al. |
| 2011/0156819 A1 | 6/2011 | Kim et al. |
| 2011/0286497 A1 | 11/2011 | Nervig |
| 2011/0286511 A1 | 11/2011 | Zeng et al. |
| 2012/0025911 A1 | 2/2012 | Zhao et al. |
| 2012/0044021 A1 | 2/2012 | Yeh et al. |
| 2012/0082203 A1 | 4/2012 | Zerbe et al. |
| 2012/0133438 A1 | 5/2012 | Tsuchi et al. |
| 2012/0213267 A1 | 8/2012 | Stojanovic et al. |
| 2012/0249217 A1 | 10/2012 | Fukuda et al. |
| 2012/0327993 A1 | 12/2012 | Palmer |
| 2013/0106513 A1 | 5/2013 | Cyrusian et al. |
| 2013/0114663 A1 | 5/2013 | Ding et al. |
| 2013/0147553 A1 | 6/2013 | Iwamoto |
| 2013/0195155 A1 | 8/2013 | Pan et al. |
| 2013/0215954 A1 | 8/2013 | Beukema et al. |
| 2013/0259113 A1 | 10/2013 | Kumar |
| 2013/0322512 A1 | 12/2013 | Francese et al. |
| 2013/0334985 A1 | 12/2013 | Kim et al. |

(56) References Cited

U.S. PATENT DOCUMENTS

| | | |
|---|---|---|
| 2014/0119479 A1 | 5/2014 | Tajalli |
| 2014/0169426 A1 | 6/2014 | Aziz et al. |
| 2014/0176354 A1 | 6/2014 | Yang |
| 2014/0177696 A1 | 6/2014 | Hwang |
| 2014/0177699 A1* | 6/2014 | Tan .................. H04L 25/03057 375/233 |
| 2014/0203794 A1 | 7/2014 | Pietri et al. |
| 2014/0266440 A1 | 9/2014 | Itagaki et al. |
| 2014/0286381 A1 | 9/2014 | Shibasaki |
| 2014/0312876 A1 | 10/2014 | Hanson et al. |
| 2015/0070201 A1 | 3/2015 | Dedic et al. |
| 2015/0117579 A1 | 4/2015 | Shibasaki |
| 2015/0146771 A1 | 5/2015 | Walter |
| 2015/0180642 A1 | 6/2015 | Hsieh et al. |
| 2015/0198647 A1 | 7/2015 | Atwood et al. |
| 2015/0319015 A1 | 11/2015 | Malhotra |
| 2016/0013954 A1 | 1/2016 | Shokrollahi et al. |
| 2016/0056980 A1 | 2/2016 | Wang et al. |
| 2016/0197747 A1 | 7/2016 | Ulrich et al. |
| 2017/0019276 A1 | 1/2017 | Francese |
| 2017/0085239 A1 | 3/2017 | Yuan et al. |
| 2017/0104458 A1 | 4/2017 | Cohen et al. |
| 2017/0214374 A1 | 7/2017 | Tajalli |
| 2017/0302237 A1 | 10/2017 | Akter et al. |
| 2017/0309346 A1 | 10/2017 | Tajalli et al. |
| 2017/0373889 A1 | 12/2017 | Sakai |
| 2018/0083638 A1 | 3/2018 | Tajalli |
| 2018/0351769 A1 | 12/2018 | Tajalli et al. |
| 2019/0199557 A1 | 6/2019 | Taylor et al. |
| 2019/0221153 A1 | 7/2019 | Tsuchi et al. |
| 2019/0379563 A1 | 12/2019 | Tajalli et al. |
| 2020/0321778 A1 | 10/2020 | Gharibdoust et al. |

FOREIGN PATENT DOCUMENTS

| | | |
|---|---|---|
| WO | 2018052657 A1 | 3/2018 |
| WO | 2019241081 A1 | 12/2019 |

OTHER PUBLICATIONS

International Search Report and Written Opinion for PCT/US2020/019083, May 27, 2020, 1-9 (9 pages).

Anadigm , "Using the Anadigm Multiplier CAM", Design Brief 208, www.anadigm.com, Copyright 2002, 2002, (6 pages).

Dickson, Timothy , et al., "A 1.8 pJ/bit 16×16 Gb/s Source-Sychronous Parallel Interface in 32 nm SOR CMOS with Receiver Redundancy for Link Recalibration", IEEE Journal of Solid-State Circuits, vol. 51, No. 8, Jul. 8, 2016, 1744-1755 (12 pages).

Hidaka, Yasuo , et al., "A 4-Channel 1.25-103 Gb/s Backplane Transceiver Macro With 35 dB Equalizer and Sign-Based Zero-Forcing Adaptive Control", IEEE Journal of Solid-State Circuits, vol. 44, No. 12, Dec. 2009, 3547-3559 (13 pages).

Holden, Brian , "An exploration of the technical feasibility of the major technology options for 400GE backplanes", IEEE 802.3 400GE Study Group, Geneva, CH, Jul. 16, 2013, 1-18 (18 pages).

Kim, Kyu-Young , et al., "8 mW 1.65-Gbps continuous-time equalizer with clock attenuation detection for digital display interface", Analog Integrated Circuits and Signal Processing, Kluwer Academic Publishers, vol. 63, No. 2, Oct. 11, 2009, 329-337 (9 pages).

Navid, Reza , et al., "A 40 Gb/s Serial Link Transceiver in 28 nm CMOS Technology", IEEE Journal of Solid-State Circuits, vol. 50, No. 4, Apr. 2015, 814-827 (14 pages).

Palmisano, G. , et al., "A Replica Biasing for Constant-Gain CMOS Open-Loop Amplifiers", Circuits and Systems, IEEE International Symposium in Monterey, CA, May 31, 1998, 363-366 (4 pages).

Schneider, J. , et al., "ELEC301 Project: Building an Analog Computer", http://www.clear.rice.edu/elec301/Projects99/anlgcomp/, Dec. 19, 1999, (9 pages).

Shekhar, S. , et al., "Design Considerations for Low-Power Receiver Front-End in High-Speed Data Links", Proceedings of the IEEE 2013 Custom Integrated Circuits Conference, Sep. 22, 2013, 1-8 (8 pages).

Shibasaki, Takayuki , et al., "A 56-Gb/s Receiver Front-End with a CTLE and 1-Tap DFE in 20-nm CMOS", IEEE 2014 Symposium on VLSI Circuits Digest of Technical Papers, 2014, (2 pages).

Takahashi, Masayoshi , et al., "A 2-GHz Gain Equalizer for Analog Signal Transmission Using Feedforward Compensation by a Low-Pass Filter", IEICE Transactions on Fundamentals of Electronics, vol. E94A, No. 2, Feb. 2011, 611-616 (6 pages).

Tierney, J. , "A Digital Frequency Synthesizer", Audio and Electroacoustics, IEEE Transactions, pp. 48-57, vol. 19, No. 1, Abstract, Mar. 1971, (1 page).

Wang, Hui , et al., "Equalization Techniques for High-Speed Serial Interconnect Transceivers", Solid-State and Integrated-Circuit Technology, 9th International Conference on ICSICT, Piscataway, NJ, Oct. 20, 2008, 1-4 (4 pages).

Won, Hyosup , et al., "A 28-Gb/s Receiver With Self-contained Adaptive Equalization and Sampling Point Control Using Stochastic Sigma-Tracking Eye-Opening Monitor", IEEE Transactions on Circuits and Systems—I: Regular Papers, vol. 64, No. 3, Mar. 2017, 664-674 (11 pages).

\* cited by examiner

SAMPLER OFFSET CALIBRATION DURING OPERATION

CROSS-REFERENCE TO RELATED APPLICATIONS

This application is a continuation of U.S. application Ser. No. 16/800,892, filed Feb. 25, 2020, naming Ali Hormati, entitled "Sampler Offset Calibration During Operation", which is a continuation of U.S. application Ser. No. 16/378,450, filed Apr. 8, 2019, naming Ali Hormati, entitled "Sampler Offset Calibration During Operation", which is hereby incorporated by reference in its entirety for all purposes.

REFERENCES

The following prior applications are herein incorporated by reference in their entirety for all purposes:

U.S. Pat. No. 9,100,232, filed Feb. 2, 2105 as application Ser. No. 14/612,241 and issued Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi].

U.S. patent application Ser. No. 15/582,545, filed Apr. 28, 2017, naming Ali Hormati and Richard Simpson, entitled "Clock Data Recovery Utilizing Decision Feedback Equalization", hereinafter identified as [Hormati].

BACKGROUND

In modern digital systems, digital information has to be processed in a reliable and efficient way. In this context, digital information is to be understood as information available in discrete, i.e., discontinuous values. Bits, collection of bits, but also numbers from a finite set can be used to represent digital information.

In most chip-to-chip, or device-to-device communication systems, communication takes place over a plurality of wires to increase the aggregate bandwidth. A single or pair of these wires may be referred to as a channel or link and multiple channels create a communication bus between the electronic components. At the physical circuitry level, in chip-to-chip communication systems, buses are typically made of electrical conductors in the package between chips and motherboards, on printed circuit boards ("PCBs") boards or in cables and connectors between PCBs. In high frequency applications, microstrip or stripline PCB traces may be used.

Common methods for transmitting signals over bus wires include single-ended and differential signaling methods. In applications requiring high speed communications, those methods can be further optimized in terms of power consumption and pin-efficiency, especially in high-speed communications. More recently, vector signaling methods such as described in [Shokrollahi] have been proposed to further optimize the trade-offs between power consumption, pin efficiency and noise robustness of chip-to-chip communication systems. In those vector signaling systems, digital information at the transmitter is transformed into a different representation space in the form of a vector codeword that is chosen in order to optimize the power consumption, pin-efficiency and speed trade-offs based on the transmission channel properties and communication system design constraints. Herein, this process is referred to as "encoding". The encoded codeword is communicated as a group of signals from the transmitter to one or more receivers. At a receiver, the received signals corresponding to the codeword are transformed back into the original digital information representation space. Herein, this process is referred to as "decoding".

Regardless of the encoding method used, the received signals presented to the receiving device are sampled (or their signal value otherwise recorded) at intervals best representing the original transmitted values, regardless of transmission channel delays, interference, and noise. This Clock and Data Recovery (CDR) not only must determine the appropriate sample timing, but must continue to do so continuously, providing dynamic compensation for varying signal propagation conditions. It is common for communications receivers to extract a receive clock signal from the received data stream. Some communications protocols facilitate such Clock Data Recovery or CDR operation by constraining the communications signaling so as to distinguish between clock-related and data-related signal components. Similarly, some communications receivers process the received signals beyond the minimum necessary to detect data, so as to provide the additional information to facilitate clock recovery. As one example, a so-called double-baud-rate receive sampler may measure received signal levels at twice the expected data reception rate, to allow independent detection of the received signal level corresponding to the data component, and the chronologically offset received signal transition related to the signal clock component.

However, the introduction of extraneous communications protocol transitions is known to limit achievable data communication rate. Similarly, receive sampling at higher than transmitted data rate is known to substantially increase receiver power utilization.

Real-world communications channels are imperfect, degrading transmitted signals in both amplitude (e.g. attenuation) and timing (e.g. delay and pulse smearing) which may be addressed via transmitter pre-compensation and/or receive equalization. Continuous time linear equalization (CTLE) is one known approach to frequency domain equalization, in one example providing compensation for increased channel attenuation at high frequencies. Time-domain-oriented equalization methods are also used to compensate for the effects of inter-symbol-interference or ISI on the received signal. Such ISI is caused by the residual electrical effects of a previously transmitted signal persisting in the communications transmission medium, so as to affect the amplitude or timing of the current symbol interval. As one example, a transmission line medium having one or more impedance anomalies may introduce signal reflections. Thus, a transmitted signal will propagate over the medium and be partially reflected by one or more such anomalies, with such reflections appearing at the receiver at a later time in superposition with signals propagating directly.

One method of data-dependent receive equalization is Decision Feedback Equalization or DFE. Here, the time-domain oriented equalization is performed by maintaining a history of previously-received data values at the receiver, which are processed by a transmission line model to predict the expected influence that each of the historical data values would have on the present receive signal. Such a transmission line model may be pre-calculated, derived by measurement, or generated heuristically, and may encompass the effects of one or more than one previous data interval. The predicted influence of these one or more previous data intervals is collectively called the DFE compensation. At low to moderate data rates, the DFE compensation may be calculated in time to be applied before the next data sample is detected, as example by being explicitly subtracted from the received data signal prior to receive sampling, or implicitly subtracted by modifying the reference level to which the received data signal is compared in the receive data sampler or comparator. However, at higher data rates the detection of previous data bits and computation of the DFE compensation may not be complete in time for the next data sample, requiring use of so-called "unrolled" DFE computations performed on speculative or potential data values rather than known previous data values. As one example, an unrolled DFE stage may predict two different compensation values depending on whether the determining data bit will resolve to a one or a zero, with the receive detector performing sampling or slicing operations based on each of those predictions, the multiple results being maintained until the DFE decision is resolved.

BRIEF DESCRIPTION

Methods and systems are described for sampling a data signal using a data sampler operating in a data signal processing path having a decision threshold associated with a decision feedback equalization (DFE) correction factor, measuring an eye opening of the data signal by adjusting a decision threshold of a spare sampler operating outside of the data signal processing path to determine a center-of-eye value for the decision threshold of the spare sampler, initializing the decision threshold of the spare sampler based on the center-of-eye value and the DFE correction factor, generating respective sets of phase-error signals for the spare sampler and the data sampler responsive to a detection of a predetermined data pattern, and updating the decision threshold of the data sampler based on an accumulation of differences in phase-error signals of the respective sets of phase-error signals.

A digital receiver system samples received signals in both amplitude and time, obtaining sufficient information to permit accurate detection and decoding of the transmitted data regardless of signal degradations induced by the communications medium. Addressing the particular characteristics of the communications medium may require signal amplification, frequency- and time-domain filtering, as well as accurate adjustment of both the time and amplitude at which sampling occurs. Methods and apparatus are described that enable operational configuration and adjustment of such receive parameters to enable accurate signal reception.

DETAILED DESCRIPTION

Figure 1:
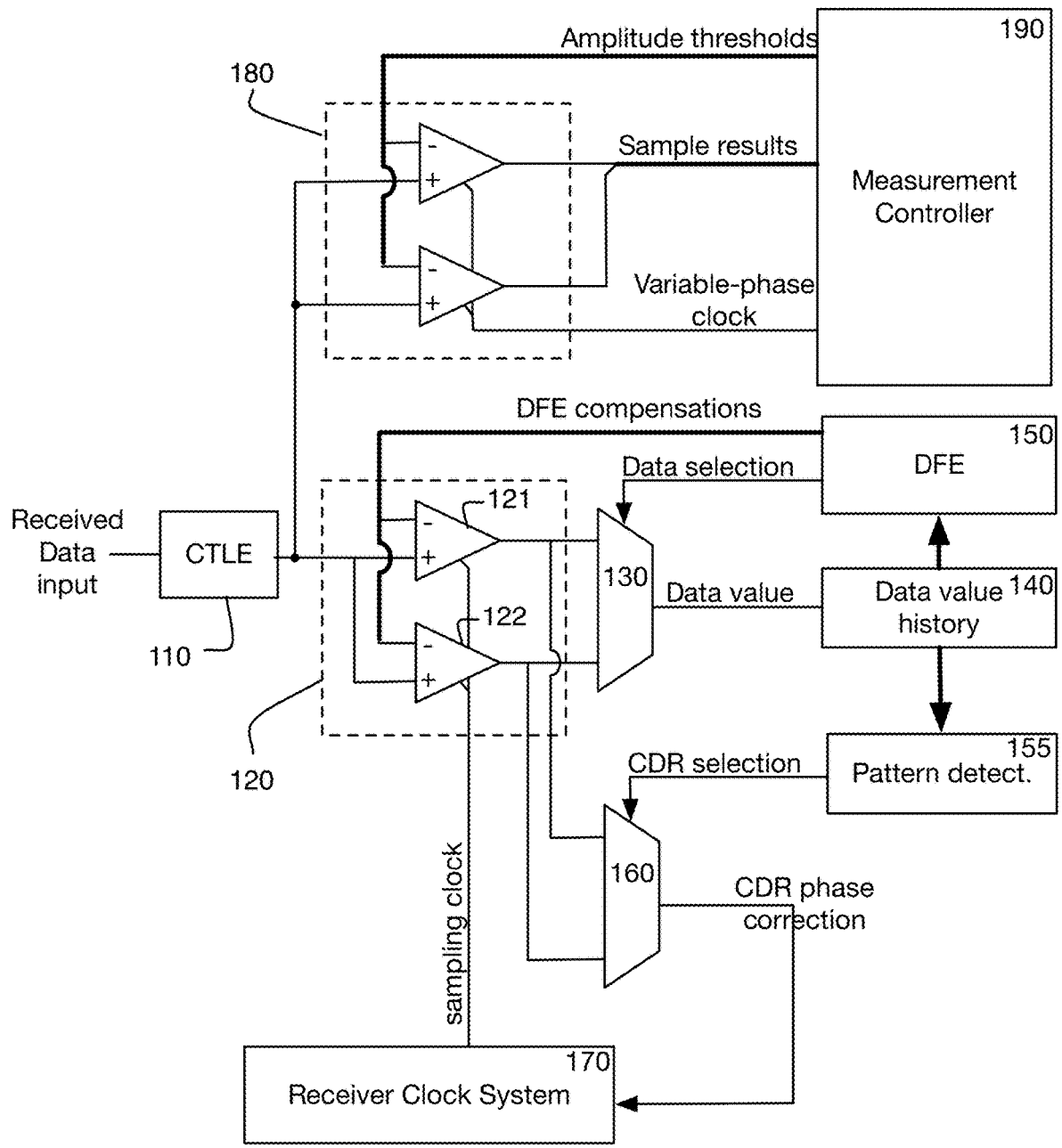
FIG. 1 is a block diagram of a receiver, in accordance with some embodiments.

In recent years, the signaling rate of high-speed communications systems have reached speeds of tens of gigabits per second, with individual data unit intervals measured in picoseconds. One example of such a system is given by [Shokrollahi], which describes use of vector signaling codes over extremely high bandwidth multiwire data communications links, such as between two integrated circuit devices in a system. Depending on the particular coding scheme used, the number of channels comprising such a communications link may range from two to eight or more, and may also communicate one or more clock signals, either within data channels or on separate communications channels.

In one embodiment utilizing a vector signaling code, multiple bits of data are encoded at the transmitter into a vector signaling "codeword", i.e. a set of symbols to be transmitted essentially simultaneously over the multiple wires or channels of the communication medium. As each such wire or channel may take on more than two possible values, each symbol of the codeword is drawn from an alphabet of allowable signal values; in examples of [Shokrollahi], alphabets of four and ten values are used in encodings of five data bits into six symbol codewords. In the receiver, the multilevel wire signals are detected to determine the received codeword, which is then decoded (e.g. by a mapping table lookup) into received data.

In an alternative embodiment, it is noted that each vector signaling codeword is a superposition of "subchannel" components, each such subchannel being an orthogonal mode or pattern of modulation of the wires or channels. Thus, in the example of [Shokrollahi], five subchannels may be summed to produce the transmitted signals, each subchannel modulated by one of the five transmitted data bits. Similarly, a vector signaling code receiver may directly detect the combination of received wire signals corresponding to a particular subchannel, as one example by using a multi-input comparator (MIC) performing a weighted summation of two or more wire signals correlated with the orthogonal mode of that subchannel, and directly producing one bit of received data. In the example of [Shokrollahi], full decoding of five data bits is shown using a set of MICs combining from two to six wire signals. As codeword and subchannel processing models are fully equivalent, interoperation is assured regardless of the particular encoding and decoding model used, e.g. allowing combination of a codeword transmitter with a MIC-based subchannel receiver based on the same orthogonal vector signaling code.

As previously mentioned, wire signals in an orthogonal vector signaling code system may take on multiple distinct values, while detected subchannel results (as one example, the results of weighted summation as at the output of a MIC) are typically binary, thus receive processing functions such as ISI reduction and skew correction may be performed more efficiently on the simpler subchannel signals rather than on the more complex wire signals.

Conventional practice for a high-speed integrated circuit receiver terminates each received signal channel, subchannel, or wire signal in a sampling device. This sampling device performs a measurement constrained in both time and amplitude dimensions; in one example embodiment, it may be composed of a sample-and-hold circuit that constrains the time interval being measured, followed by a threshold detector or digital comparator that determines whether the signal within that interval falls above or below (or in some embodiments, within bounds set by) a reference value. Alternatively, a digital comparator may determine the signal amplitude followed by a clocked digital flip-flop capturing the result at a selected time. In other embodiments, a combined time- and amplitude-sampling circuit is used, sampling the amplitude state of its input in response to a clock transition. In some embodiments, the time at which a sample is captured may be adjusted in some or all of the receiver samplers; in some embodiments, the threshold level to which a sample is compared may be adjusted, in some or all of the receiver samplers.

For descriptive convenience, this document will use the term sampling device, or more simply "sampler" to describe the receiver component that obtains an input measurement, as it implies both the time and amplitude measurement constraints, rather than the equivalent but less descriptive term "slicer" also used in the art. In some embodiments, the time at which a sample is captured may be adjusted in some or all of the receiver samplers; in some embodiments, the threshold level to which a sample is compared may be adjusted in some or all of the receiver samplers. As one example, the well-known receiver "eye plot" diagram is typically obtained by iterative adjustment of these parameters, with the results plotted graphically as signal amplitudes over time.

Embodiments described herein can also be applied to prior art permutation sorting methods not covered by the vector processing methods of [Shokrollahi]. More generally, embodiments may apply to any communication or storage methods, in particular those requiring coordination of multiple channels or elements of the channel to produce a coherent aggregate result.

Clock Data Recovery

Clock Data Recovery or Clock Data Alignment (CDR or CDA) circuits as in [Hormati] extract timing information, either from the data lines themselves or from dedicated clock signal inputs, and utilizing that extracted information to generate clock signals to control the time interval used by received signal sampling device. The actual clock extraction may be performed using well known circuits such as a Phase Locked Loop (PLL) or Delay Locked Loop (DLL), which in their operation may also generate higher frequency internal clocks, multiple clock phases, etc. in support of receiver operation. Implementation distinctions between CDR and CDA embodiments as described in the art are irrelevant to the present descriptions, thus the term CDA will subsequently be used herein as a generic identifier, without implying limitation.

In one common CDA embodiment, a first sample time is configured to optimally obtain the data sample, and a second sample time is configured to optimally determine whether the phase of the internal clock remains aligned with incoming signal transitions, which may be as much as ½ of a received signal unit interval (UI) offset in time from the optimum data sampling time. As sampling in such embodiments occurs twice per received unit interval, such systems are described as utilizing a double baud rate CDA. Such systems are very common in low speed communications system or where the received signal exhibits very sharp transitions, i.e. where there is significant displacement in time between observation of a signal transition and optimum sampling of data.

Receive Signal Equalization

At high data rates, even relatively short and high-quality communications channels exhibit considerable frequency-dependent signal loss, thus it is common for data receivers to incorporate receive signal equalization. Continuous-time Linear Equalization (CTLE) is commonly used to provide increased high frequency gain in the receive signal path, in compensation for the increased high frequency attenuation of the channel.

It has also become common practice for data communications receivers to incorporate Decision Feedback Equalization (DFE) to compensate for signal propagation anomalies in the communications medium. The DFE system performs non-linear time-domain equalization on the received signal by maintaining a history of previously-received data values at the receiver, and processing those historic data values with a transmission line model to predict the expected influence each of the historical data values would have on the present receive signal. Such a transmission line model may be pre-calculated, derived by measurement, or generated heuristically, and may encompass the effects of one or more than one previous data interval.

In a typical receiver design, this computed DFE compensation value will be subtracted from the current receive signal input to produce a corrected signal more accurately representing the received data value. Those familiar with the art will recognize that the DFE compensation value produced as described above cannot be calculated until the previous unit interval's data value has been detected. Thus, as data rates increase, a point will be reached at which the information to produce the DFE compensation value is not available in time to be applied to the next unit interval sampling. Indeed, at the highest data rates currently used in practice, this situation may exist for multiple previous unit intervals, as the detection time for a single data value may represent multiple unit interval durations, requiring the receiver to pipeline or parallelize the detection operation. Thus, it is common for embodiments to forgo such "closed loop" DFE methods for one or more of the most recent unit intervals, instead relying on an "open loop" or "unrolled loop" generation of one or more elements of the DFE compensation value for these most recent unit intervals.

In an effort to accelerate such DFE operation, some embodiments speculatively produce DFE compensation values corresponding to each of the possible detected data values for a given unit interval. One embodiment incorporates multiple data detection samplers, each provided with a distinct value of DFE compensation associated with the possible detected data values for one or more previous unit intervals. The result of each sampler is stored until the previous data value is known, at which time the corresponding stored result is selected for data detection.

The set of DFE compensation values speculatively created to represent the constellation of potential detected data results over the previous transmit unit interval or intervals represent a set of measurement levels spanning some portion of the receive signal amplitude range. As an example, previous transmission of consecutive "zero" signals might lead to a predicted lower threshold level for a subsequent receiver data measurement incorporating speculative DFE compensation, while previous transmission of consecutive "one" signals might lead to a predicted higher threshold level for the same data measurement. Thus, for any data measurement used to detect an actual data value, the described multiple-sampler receiver will potentially perform measurement operations using thresholds either too high or too low for the actual signal during that interval.

CDA Combined with DFE

In high speed communications systems operating over channels with significant frequency-dependent attenuation, received signals often have significantly sloped rise and fall times, even after receive signal equalization. Thus, a signal sampler timed to trigger at "center of eye" may under some circumstances still intersect with a signal transition still transitioning from one data value to the next, especially if that received signal is significantly perturbed by ISI. One such example may be seen in FIG. 2B, where the sampling point marked by "+" intersects with the signal trajectory identified as [0,1,1]. A receiver incorporating DFE will compensate for this behavior by having its effective data sampling threshold adjusted to be further away from the signal trajectory, while a fixed-threshold sampler (i.e. one not obtaining the benefit of DFE) might detect an incorrect value.

In such environments, it is possible to utilize a single sample time per received unit interval to determine both data value and clock phase. These baud-rate CDA embodiments rely on the observation that certain combinations of received ISI and detection sampling threshold have sub-optimal data sampling characteristics; that is, they have a high probability of intersecting with a changing input signal having a slow rise and fall time. Thus, by controlling the receive equalization to constrain transition rates, and then restricting observation of clock timing to only those sampling thresholds and received data patterns (which correlate to particular ISI levels) that provide such intersections, a single sampling time may be utilized for both clock and data sampling.

At least one embodiment [Hormati] takes advantage of this effect to utilize measurement operations from multiple samplers or comparators performing speculative DFE operations. In this embodiment, a stored speculative result not used for determining the received data value (that is, measured at a signal offset above or below the appropriate DFE correction for that interval, but at the same time as the valid data sample) may provide information relating to clock recovery.

Operational Considerations

As may be expected, obtaining this advantageous interaction between received signal quality, equalization levels, sampling levels, and clock timing can require careful configuration of receive system parameters, as well as ongoing operational monitoring and adjustment. Moreover, as each of these parameters affects received signal quality, adjustment during receiver operation must be performed in a manner that, in both information measurement and in change to configuration or operational parameters, does not impact normal signal reception.

As a descriptive simplification, this document will hereinafter use the term "intrusive" to describe a system measurement, adjustment, or configuration change during normal operation that will or potentially may disrupt normal receiver operation or lead to detection of incorrect data values from a given signal source. Conversely, the term "non-intrusive" will describe a system measurement, adjustment, or configuration change during normal operation that may be performed without disrupting normal reception of correct data values from that signal source.

It may be costly in terms of circuit complexity and power consumption to provide accurate or real-time data about key parameters such as received signal levels. In practical embodiments, a signal sampler does not record the actual amplitude of its input, only an indication that at the time it was triggered the input value was above or below its threshold level. Thus, some embodiments may employ a spare sampler operating outside of the data signal processing path to measure the "top" or "bottom" of a signal eye by incrementally adjusting the decision threshold up or down until invalid data is produced at its output, as compared to data received by the data sampler operating in the data signal processing path. Similarly, the spare sampler may measure the "width" of the eye opening by incrementally advancing and postponing a variable-phase measurement clock from e.g., a phase interpolator, while comparing the sampled result to data decisions generated by the data sampler.

Additionally, complicating these operational concerns, significant elements in most system embodiments incorporate analog processing functions that have stability issues, in particular the sampling device itself. As component parameters such as transistor gain and threshold voltage change with temperature and variations in supply voltage, the sampling device's threshold level and the amplitude and baseline voltage of the signal it measures may drift, requiring periodic calibration and adjustment. Moreover, process variations across an integrated circuit device may result in different samplers having different characteristics, in particular different threshold voltages and thus different sampling thresholds. Thus, some solutions incorporate redundant analog processing elements, allowing one set of elements to be switched out of the data signal processing path to be calibrated or adjusted, while another set is switched into the data signal processing path to actively process receive data. Although non-intrusive, significant duplication of power-hungry circuits such as analog amplifiers, comparators, and samplers may lead to unacceptable system power consumption, and replacing samplers and redirecting DFE feedback may prove to be practically difficult. Thus solutions that avoid sampler replacement.

Example Embodiment

For purposes of description and without implying limitation, a serial data receiver as shown in FIG. 1 will be used as an example. This example receiver includes at least one stage of speculative DFE 150 supported by two comparators 120 performing concurrent time-sampling operations at two different amplitude thresholds, and a receiver clock system 170 to produce a sampling clock, the phase of which may be adjusted by a CDR correction to optimize data sampling timing. As shown, the data samplers include two comparators 120 generating comparator output slicing the data signal received from CTLE 110 and sampling the comparator output according to the sampling clock. Before sampling, the received data signal may be amplified and/or equalized by CTLE 110.

In some embodiments, an apparatus includes two comparators 120 configured to generate two comparator outputs, the two comparators configured to compare a received data signal to a first threshold as at comparator 121 and a second threshold as at comparator 122, according to a sampling clock, the first and second thresholds determined by an estimated amount of inter-symbol interference on a multi-wire bus. In some embodiments, the first and second thresholds correspond to decision feedback equalization (DFE) correction values associated with the preceding unit interval. The apparatus may further include a data decision selection circuit 130 configured to select one of the two comparator outputs as a data decision, the selection based on at least one prior data decision that may be stored in data value history 140. Multiplexer 130 may select the output of comparator 121 as the data decision if the previously received bit stored in data history 140 is a logic '1', while the output of comparator 122 is selected as the data decision if the previously received bit is a logic '0'. The apparatus further includes a phase-error indication selection circuit 160 configured to select the other output of the two comparator outputs as a phase-error signal in response to receiving a CDR selection signal from a pattern detection circuit 155 configured to identify a predetermined data decision pattern in the data value history storage 140.

In some embodiments, one or more spare samplers 180 provide additional measurement capability. While FIG. 1 includes two spare samplers 180, it should be noted that such an embodiment should not be considered as limiting, and spare samplers 180 might include a single spare sampler, or more than two spare samplers. In one such embodiment, one or more spare samplers 180 may be configured to gather eye scope data, using Amplitude threshold(s) and/or a variable-phase adjusted clock. Such a variable-phase adjusted clock may be configurable to move horizontally around the sampling interval, or may correspond to the sampling clock provided to comparators 120 that corresponds to the center-of-eye sampling instant. A clock selection circuit (not shown) may be used to select between two such clocks. In a further mode, Measurement Controller 190 may configure one or more spare samplers 180 to obtain non-intrusive measurements of received signal amplitudes or transition timing.

In some embodiments, the apparatus further includes a receiver clock system 170 configured to receive the phase-error signal and to responsively adjust a phase of the sampling clock. In some embodiments, the phase-error indication is an early/late logic decision on a transition of the received signal. In some embodiments, the data decision selection circuit 130 and phase-error indication circuit 160 select different comparator outputs. In some embodiments, the apparatus further includes a decision-feedback equalization (DFE) circuit 150 configured to generate the first and second thresholds.

In some embodiments, the apparatus further includes a sub-channel detection multi-input comparator (MIC, not shown) operating on signals received via a plurality of wires, the sub-channel detection MIC configured to generate the received data input signal. In such embodiments, the signals received via the plurality of wires correspond to symbols of a codeword of a vector signaling code, the codeword corresponding to a weighted summation of a plurality of sub-channel vectors, each sub-channel vector mutually orthogonal. In such an embodiment, the inter-symbol interference is sub-channel specific, the sub-channel specific ISI corresponding to modulation of components of a corresponding sub-channel vector associated with the received signal. In some embodiments, sub-channel specific ISI associated with each sub-channel vector is mutually orthogonal. In some embodiments, the apparatus may further include a filter configured to filter the received signal prior to generating the comparator outputs.

In some embodiments, at least the data samplers 120 of FIG. 1 are duplicated 180 so as to permit one set of data samplers measuring a received signal to operate intrusively, while another set of data samplers measuring the same received signal operates non-intrusively. In further embodiments, at least one of the comparator threshold(s), sample timing, CTLE gain, and CTLE equalization are modified for at least one set of data samplers during said measurement and/or adjustment.

Figure 2A:
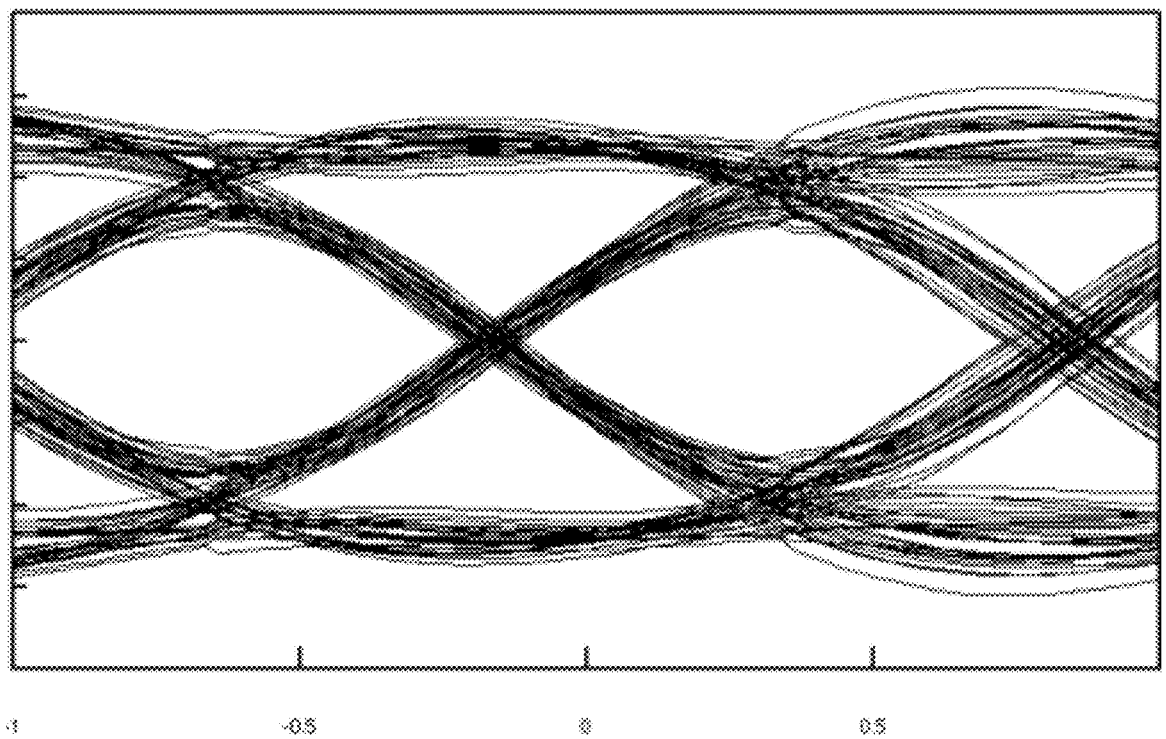
FIGS. 2A and 2B shows an example receive signal as an eye diagram.

FIG. 2A is an example of a typical receive signal "eye", produced by a time-overlay of the receive signal over multiple unit intervals. Thus, each individual line comprising the eye represents the receive signal "trajectory", as it passes from one unit interval to the next.

Figure 2B:
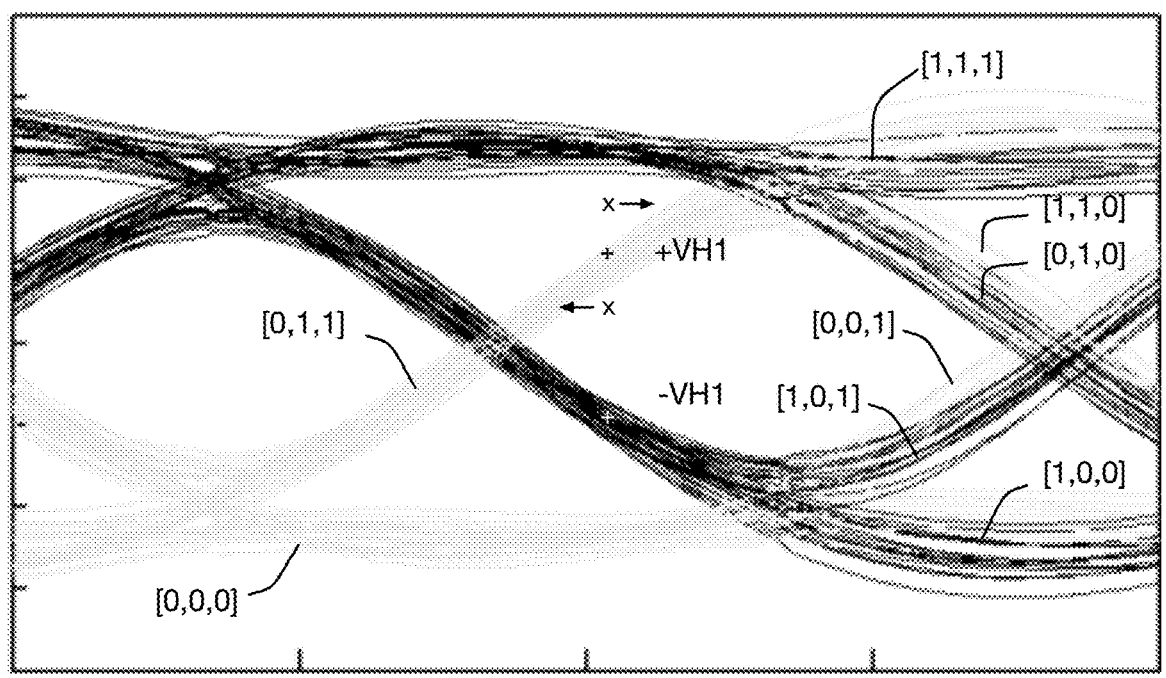

In FIG. 2B, subsets of signal trajectories comprising the eye of FIG. 2A are labeled using a triplet notation of [previous data value, current data value, subsequent data value]. As would be expected, the [1, 1, 1] trajectories are clustered along the top of the graph, the [1, 1, 0] trajectories transition downward at the right of the graph, [0, 0, 1] transition upward at the right of the graph, etc. Trajectories corresponding to a previous received data value of "1" (thus, optimally detected by the upper DFE sampling location) are shown as bold lines, while those trajectories corresponding to a previous received data value of "0" (and thus optimally detected by the lower DFE sampling location) are shown as pale lines.

The upper DFE sampler location selected by a DFE system to detect the current data value if the previous data value was "1" is shown with the black symbol + labeled "+VH1". It may be noted that this sampler location is well positioned in the center of the upper data eye, but also is directly over the trajectory of a [0,1,1] received signal (the current data value of which will be detected by the lower sampler location, as determined by the previous data value of "0".) Thus, the sampler having the decision threshold set to "−VH1" (indicated by the white + symbol), effectively corresponds to an edge sample that may be utilized by the CDR system to determine whether the sampler timing is early or late relative to that signal transition. Use of sampler outputs as early-late indications causes the sampling clock to have a lock point associated with the DFE correction factors ±VH1, as the CDR will adjust the phase of the sampling clock until the early-late indications selected from the data samplers responsive to the transition data patterns are approximately a 1:1 ratio.

In some embodiments, the signals shown in FIGS. 2A and 2B correspond to outputs of a sub-channel detection multi-input comparator (MIC) that is configured to receive a plurality of symbols of a codeword, and to detect modulations of a corresponding sub-channel vector of a plurality of sub-channel vectors, each sub-channel vector being mutually orthogonal. The codeword corresponds to a summation of the plurality of sub-channel vectors, and each sub-channel vector may be individually modulated by a corresponding information bit receive at an encoder generating the codeword. In such embodiments, the ISI seen in FIGS. 2A and 2B are sub-channel specific in that the ISI seen by the modulation of the corresponding sub-channel vector is only seen at the corresponding MIC. Thus, in a system with at least two sub-channel detection MICs, the ISI due to modulation of a first sub-channel vector is not felt at a second MIC for detecting a second sub-channel vector because the first and second sub-channel vectors are orthogonal.

Dynamic Data Sampler Decision Threshold Adjustment

As previously mentioned, reliable and error-free detection of received data signals may include accurate adjustment of a data sampler threshold at a predetermined time and amplitude position within the receive signal "eye". Drift of that predetermined sampler vs. signal relationship over time, temperature, or supply voltage can lead to an increased receive bit error rate, and ultimately detection failure.

One known solution calibrates and adjusts a spare sampler offline (i.e. in a nonintrusive manner) and then exchanges that preconfigured unit with the active data sampler, freeing it to be calibrated and adjusted. In such a system, switching circuitry must be provided to all signals entering, controlling, and output by the samplers so that they may be directed as required to either data path or calibration functions.

To avoid use of such switching circuitry, one embodiment performs measurements using a spare sampler operating outside of a data signal processing path, and then uses information obtained through such measurements to adjust operation of the data samplers operating in the data signal processing path in a nonintrusive manner. As the spare sampler is not part of the active data signal processing path, threshold levels and clock timing may be adjusted without impacting received data, allowing identification of both the extremes of normal operation (i.e. the boundaries of the received "eye" opening). In some embodiments, such adjustments to the spare sampler are comparable to those used to obtain the statistical data required to plot an eye diagram, and thus may subsequently be referred to as an eye sampler hereinafter, without implying limitation.

As both DFE compensation and data sampling thresholds are dependent on overall eye height, the measurement procedure may include determining a vertical eye opening of the data signal using the normal data sampling clock timing and an initial center-of-eye threshold value approximating the center-of-eye value. In one particular example, the spare sampler decision threshold is increased until the spare sampler decisions differ from the data decisions reported by the data sampler by some predetermined ratio to find the top of the eye opening, and lowered until the spare sampler decisions again differ from the data decisions reported by the data sampler by the predetermined ratio to find the bottom of the eye. For example, the spare sampler decision threshold may be raised until the spare sampler reports one '1' output for every eight '0' outputs, resulting in a 1:8 ratio. The ratio may be selected as a degree of accuracy. The center-of-eye value thus corresponds to the midpoint between the determined top-of-eye value and bottom-of-eye value. In some embodiments having significant ISI (i.e. requiring substantial DFE compensation for proper data reception) comparisons between eye data results and data sampler results when determining top and bottom of the eye are gated to occur only for certain received data patterns, such as [1, 1, 1] and [0, 0, 0]. In some embodiments, a predetermined threshold of positive vs. negative data comparisons, i.e. a ratiometric limit, is used when determining whether results do or do not match.

Although some embodiments may perform results capture and analysis in real time, other embodiments may simply record sampler results, with results comparison, pattern matching, etc. being performed on this historic or stored information. Embodiments may use Boolean logic, a finite state machine, or software executing on an embedded processor or management system to perform these operations.

It should be noted that this method of measurement does not produce a calibrated result, e.g. an absolute numeric value for eye opening in millivolts. Instead, the result will typically be obtained in units associated with the internal threshold adjustment means, for example, the values (in arbitrary internal units) that are input to a digital-to-analog converter (DAC) generating the analog sampler threshold levels. As the DAC is not calibrated against an external reference and the sampler is known to have a (variable and unmeasured) offset, the resulting eye opening values are relative, not absolute. That said, because the described measurement results do include the sampler offset, settings derived from those results produce consistent results when applied to setting the threshold of the same eye sampler.

Once the vertical eye opening has been determined, appropriate sampling threshold levels for data detection may be determined. In a receiver system using one level of DFE speculation as shown in the example of FIG. 1, the threshold levels will include the H1 terms of the DFE compensation corresponding to the signal levels associated with the measured eye opening.

The vertical decision threshold level for the spare sampler, having been initialized according to the previously-determined center-of-eye value and the DFE correction factor associated with the data sampler selected for calibration, may provide decisions that differ from that of the data sampler, indicating that data reception may be improved. At least one embodiment incrementally modifies the decision threshold value currently in use by the data sampler based on the decisions obtained from the spare sampler, as decision from the spare sampler are assumed to be correct due to calibration of the vertical decision threshold according to a true center-of-eye value. In one example, the decision threshold of the data sampler is increased or decreased by a unit increment. If more significant changes are indicated, an intermediary conversion step may be performed, as the determined parameters for the spare sampler typically cannot be directly applied to the data samplers due to the previously described differences in circuit behavior, one example being the internal sampler offset.

In one embodiment, a second measurement procedure is performed which incrementally adjusts the spare sampler decision threshold away from the initialized decision threshold, until the decisions generated from the spare sampler behavior match the decisions from the data sampler. In one particular embodiment, the procedure analyzes decisions that correspond to phase-error signals as determined by a pattern detection circuit. The amount of incremental adjustment made to the decision threshold of the spare sampler from the initialized decision threshold to a decision threshold that approximates the behavior of the data sampler corresponds to an offset correction representative of the amount of incremental adjustment that may be applied in the opposite direction to the presently configured decision threshold of the data sampler to produce an improved data detection result. Application of the adjustment may be applied via numerous ways, including applying the entire differential adjustment, applying a portion of the differential adjustment, applying multiple portions of the adjustment applied incrementally over time, or applying a single incremental adjustment followed by a repetition of the entire measurement procedure.

As described above, determining differences in sampler behavior may include a more sensitive procedure than merely comparing sampled data outputs. Reviewing FIG. 2B, it is apparent that considerable timing and/or threshold variation may occur around the sampling point indicated by the horizontal position of the "+" symbol before any change of detection of "1" data bits would be apparent; this is essentially the premise for choosing a "center of eye" sampling point, maximizing the probability of correct data detection under varying conditions. However, even very small variations in the vertical decision threshold would produce different results for edge sampling, for example of the vertical position of the black "+" at the sampling point sampling point on the [0, 1, 1] signal trajectory in FIG. 2B.

Figure 3:
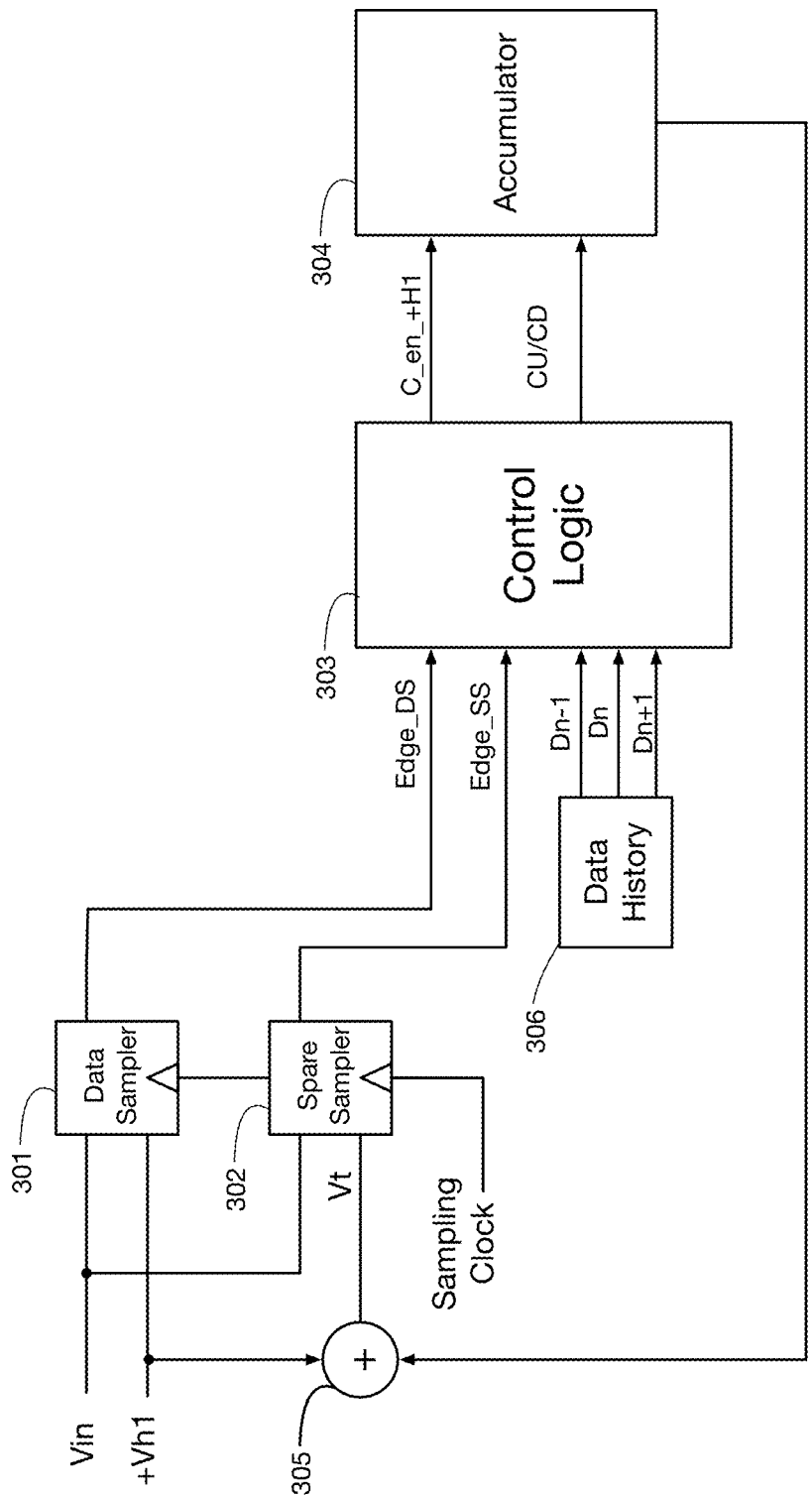
FIG. 3 is a block diagram of an embodiment of a measurement system.

An embodiment monitors edge samples obtained from a the spare sampler in comparison with edge samples obtained at the same unit sampling instant from the data sampler, where edge samples are gated or chosen using pattern matching of sequential received data values, and the edge sample results are obtained from the loop-unrolled DFE samplers not providing a data value in that unit interval, as previously described. In one embodiment, differences in edge sample values (for example, as determined by an XOR operation,) identify different sampler behavior, with the signs of the edge samples and the value of the gating data pattern indicating the direction of the differences. FIG. 3 is a block diagram of one such embodiment. FIG. 3 includes data sampler 301 and spare sampler 302 both operating on a data signal Vin. In some embodiments, the data signal may be a test pattern, while alternative embodiments may operate on a data signal containing information. Data sampler 301 operates according to vertical decision threshold +Vh1, which may correspond to application of a DFE correction factor associated with information received in the prior signaling interval. Spare sampler 302 operates according to the same DFE correction factor +Vh1 and is shown in FIG. 3 to operate according to a control signal received from accumulator 304. As previously described, the decision threshold of the spare sampler 302 may be initialized according to a determined center-of-eye value and the DFE correction factor associated with the data sampler selected to be calibrated, which in the embodiment shown in FIG. 3 is the +H1 data sampler. Control logic 303, which may be part of e.g., measurement controller 190, receives edge samples from the data sampler (DS) Edge_DS and the spare sampler (SS) Edge_SS that may correspond to phase-error signals as determined responsive to a pattern detection. As shown in FIG. 2B, the decision threshold indicated by the black "+" symbol for +VH1 lies approximately on the [0, 1, 1] trajectory, and may thus be used as a phase-error signal. The pattern detection may be performed on data bits $D_{n-1}$, $D_n$ and $D_{n+1}$ received via data history 306, which may correspond to the data decision from the unit interval prior to the edge decisions, the data decision in the same unit interval as the edge decisions, and the data decision in the subsequent unit interval with respect to the edge decisions, respectively. Responsive to a detection of the data pattern, the edge samples may be compared to each other and utilized for adjustment of the decision threshold of one of the data sampler and spare sampler. Accumulator 304, which may be part of e.g., measurement controller 190, may accumulate differences in phase-error signals and used to ultimately update the data decision threshold of the data sampler operating in the data signal processing path.

Figure 4A:
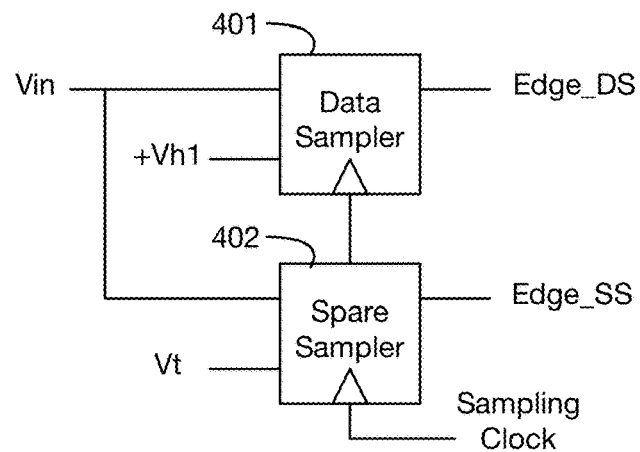
FIG. 4A is a block diagram of a data sampler and a spare sampler, in accordance with some embodiments.
Figure 4B:
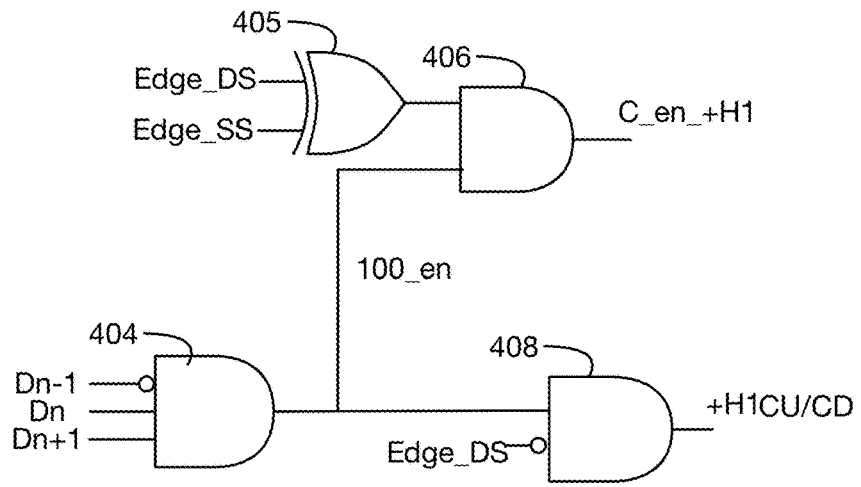
FIGS. 4B and 4C are schematic drawings showing logic details for a control circuit as depicted in the system of FIG. 3, in accordance with some embodiments.
Figure 4C:
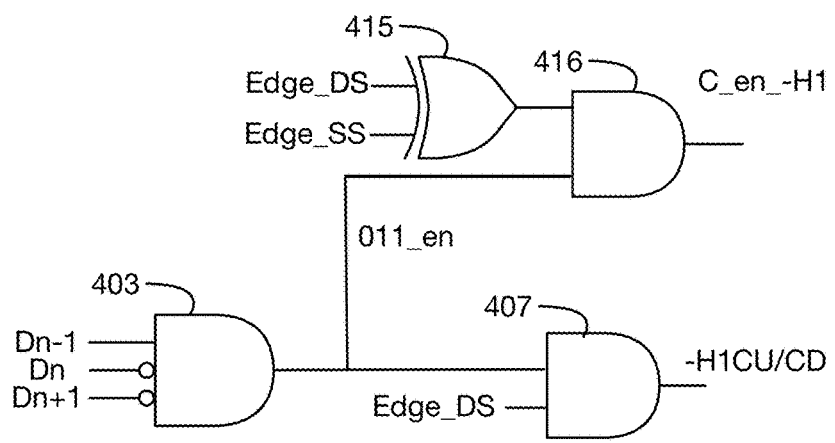

FIGS. 4A, 4B and 4C shows additional details for control logic 303, in accordance with some embodiments. As shown, FIG. 4A includes the +H1 data sampler 401 and the spare sampler 402. The −H1 data sampler is not shown in FIG. 4A for brevity. The +H1 data sampler 401 generates a phase-error signal Edge_DS of the data signal as compared to the +VH1 DFE correction factor during a [0, 1, 1] data pattern while spare sampler 402 generates phase-error signal Edge_SS of the data signal as compared to the spare sampler decision threshold Vt as initialized by the previously-determined vertical center of eye value and the +VH1 DFE correction factor. FIGS. 4B and 4C illustrate the logic for obtaining control signals for the registers associated with the +H1 data sampler and −H1 data sampler, respectively. As shown, the [previous data, current data, subsequent data] data pattern [0, 1, 1] is used to identify edges suitable for evaluating alignment from the +H1 samplers, as determined by logic gate 404 in FIG. 4B, while the data pattern [1, 0, 0] is used to identify edges suitable for evaluating alignment from the −H1 samplers, as determined by logic gate 403 in FIG. 4C.

As described above, logic AND gate 404 in FIG. 4B is used to identify the data pattern [0, 1, 1] based on [$D_{n-1}$, $D_n$, and $D_{n+1}$]. Logic XOR gate 405 verifies that the phase-error signals Edge_DS and Edge_SS provided by the data sampler and spare samplers respectively are different. Logic AND gate 406 generates a count enable signal c_en_+H1 for the register 501 associated with the +H1 data sampler, and logic AND gate 408 converts the phase-error signal Edge_DS from the data sampler to an early-late signal +H1CU/CD based on the truth table given below in Table I.

Gates 403, 415, 416, and 407 perform similar functions as logic gates 404, 405, 406, and 408 described above, respectively, for the −H1 data sampler to generate count enable signal c_en_−H1 and early-late signal −H1CU/CD. Table I below is a truth table showing the relationship of the detected data patterns to the decisions from the data sampler, and the early/late direction of the differences:

TABLE I

| | | Pattern | | |
|---|---|---|---|---|
| | | [0, 1, 1] (+H1) | [1, 0, 0] (−H1) | |
| Edge_DS | 0 | early | late | Late = '0' = Count Down |
| | 1 | late | early | Early = '1' = Count Up |

Figure 5:
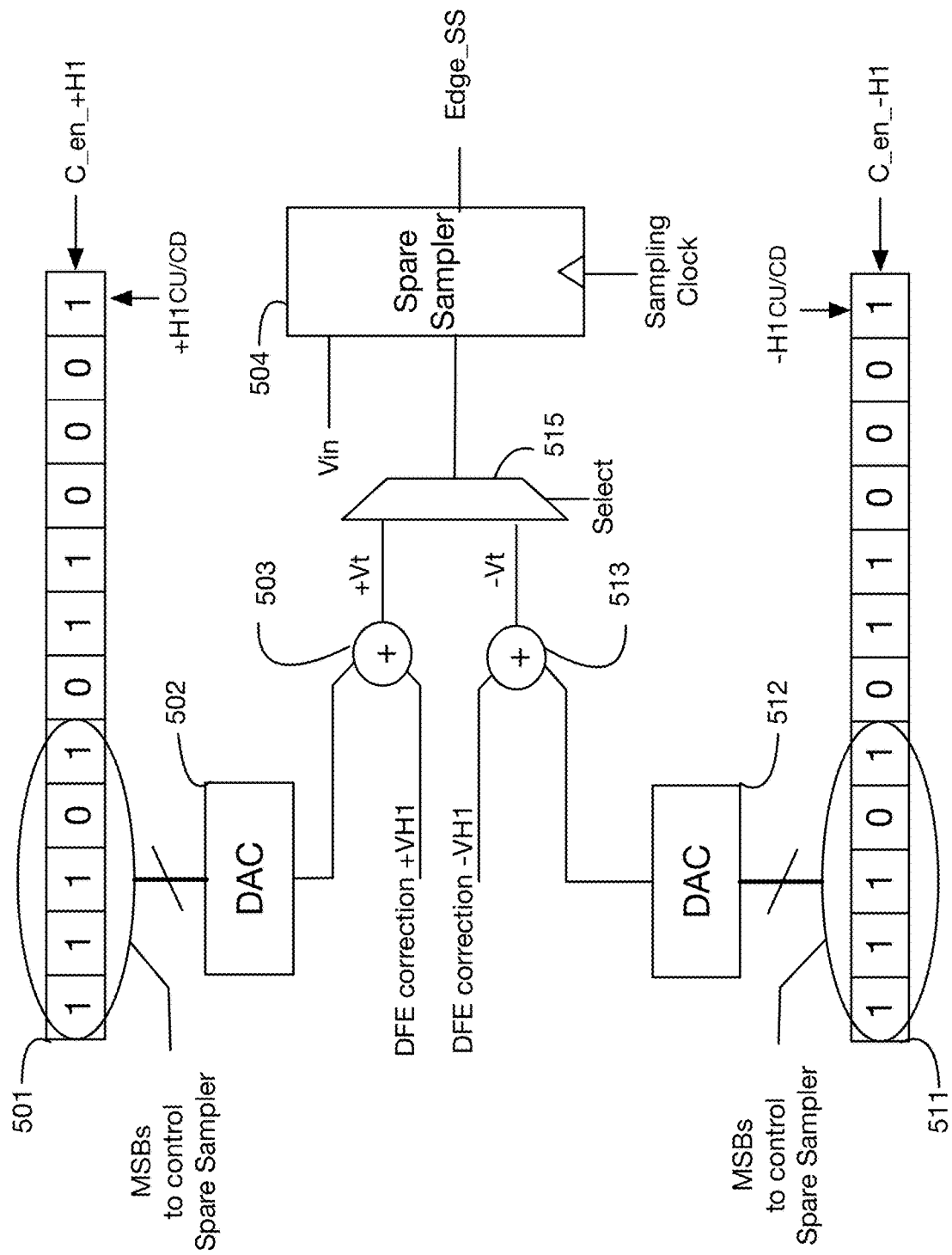
FIG. 5 is a schematic of a further embodiment.

FIG. 5 illustrates one particular embodiment of an accumulator 304. As shown, the registers 501 and 511 accumulate difference indications for the +VH1 and the −VH1 data samplers, respectively, the higher order bits of which control the DAC contributing to the thresholds for spare sampler 504. The threshold for the +H1 comparator generating phase-error signals from decisions of the data signal against the +H1 DFE correction factor during [0, 1, 1] data patterns is controlled by counter 501, DAC 502, and summation node 503, while the threshold for the −H1 comparator generating phase-error signals from decisions of the data signal against the −H1 DFE correction factor during [1, 0, 0] data patterns is controlled by counter 511, DAC 512, and summation node 513. Controlling signals for up/down counting direction ±H1CU/CD and counting enable c_en_±H1 are provided e.g., by logic of FIGS. 4B and 4C. After a sufficient number of gated edge sample comparisons and updates to the least significant bit (LSB) position, the higher order set of bits corresponding to a most significant bit (MSB) portion of the counters will produce changes to the spare sampler threshold via the DAC, until the spare sampler and data sampler behaviors as indicated by CDA edge decisions are the same. The number of counter bits below the set of MSBs controlling the DAC determines the amount of averaging or smoothing of multiple sampling events that is provided between incremental threshold changes applied to either the spare sampler or in some embodiments directly to the data sampler. A logic circuit, finite state machine, or processor executing a stored program may then examine the spare sampler DAC settings in comparison to the DAC settings found to produce optimized detection and apply all or part of that difference to the current data sampler DAC settings. As further shown in FIG. 5, the apparatus may include some steering logic, e.g., via multiplexor 515 to select between calibrating the +H1 and −H1 data samplers responsive to a selection signal.

While the embodiment of FIG. 5 indicates that the MSB portions of the register are used to control the decision threshold of the spare sampler, an alternative embodiment utilizes an equivalent logic and counter-based accumulator of FIGS. 3, 4A-4C, and 5 to directly control the decision threshold of the data samplers rather than the spare samplers during the accumulation of differences.

While the above embodiments describe updating the decision thresholds of the spare sampler and/or the data sampler responsive to the comparisons of the phase-error signals, it should be noted that at least one alternative embodiment updates the sampling instant of the spare sampler using a sampling clock provided by e.g., a phase interpolator. Such an embodiment may provide horizontal adjustments of the spare sampler based on the comparisons of the phase-error signals. As shown in FIG. 2B the +VH1 decision threshold of the data sampler marked by the '+' symbol lies on the [0, 1, 1] data pattern trace in a locked condition. Two possible scenarios of the spare sampler decision threshold being different than the decision threshold of the data sampler are shown in FIG. 2B marked by 'x' symbols. When calibrating the +H1 data sampler, if the decision threshold of the spare sampler is less than the decision threshold of the +H1 data sampler, the sampling time of the spare sampler may be moved earlier until the phase-error signals begin to match, and vice versa if the decision threshold of the spare sampler is larger than the decision threshold of the +H1 data sampler. The direction in which the sampling instant is moved may thus be used to determine the direction for which to adjust the decision threshold of the +H1 data sampler. A similar technique may be used to adjust the −H1 data sampler.

In some embodiments, the spare sampler 504 is used as described above to identify offset corrections to be applied to the +VH1 and −VH1 data samplers separately prior to updating the vertical decision thresholds of the data samplers. After offset corrections are determined for both data samplers, the vertical decision thresholds of both data samplers are updated simultaneously. In some embodiments, the vertical decision thresholds of both data samplers may be updated by a single unit step in a direction identified by the offset corrections. Alternative embodiments may increment the vertical decision thresholds of the data samplers in a direction and magnitude identified by the offset corrections.

Figure 6:
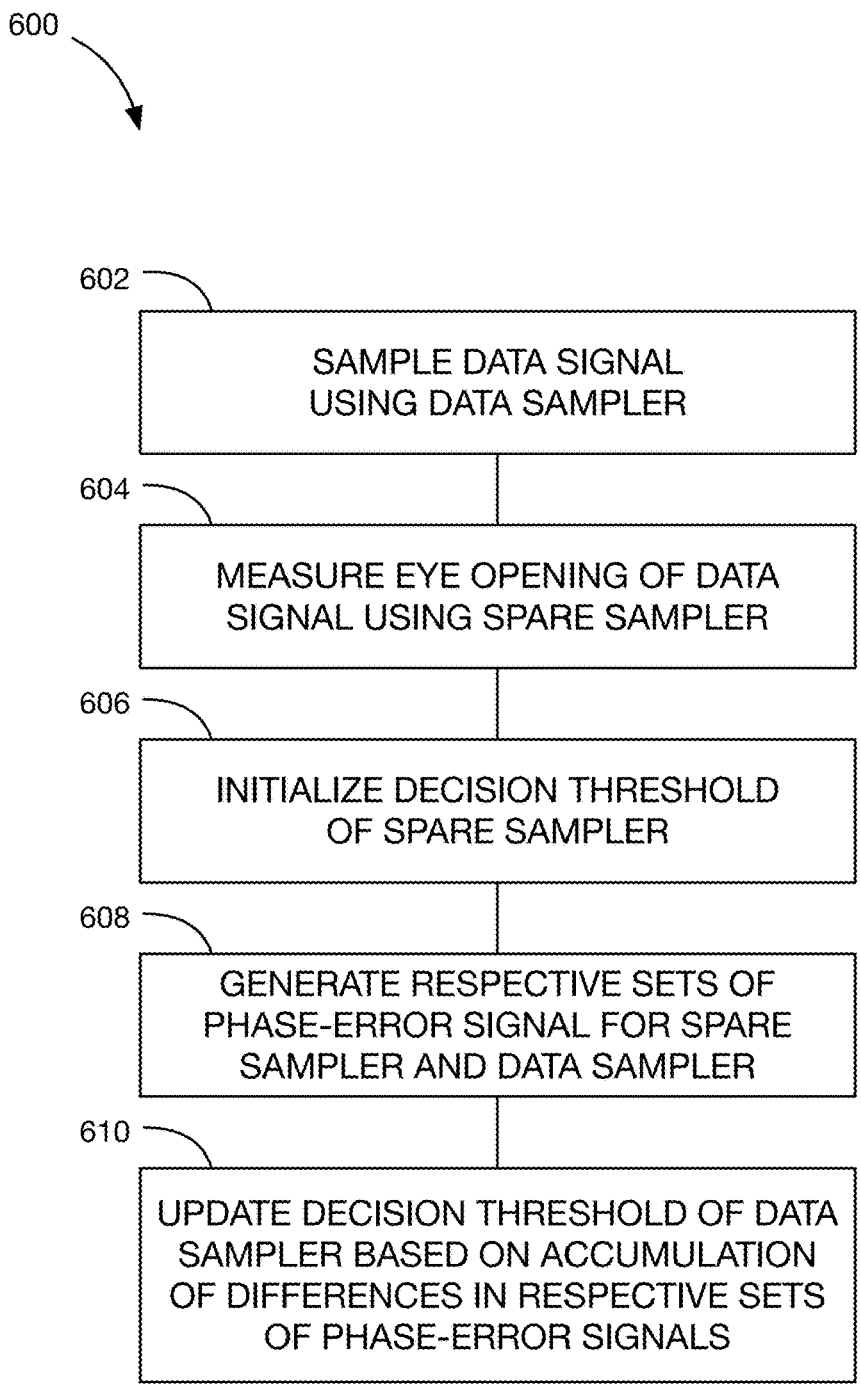
FIG. 6 is a flowchart of a method 600, in accordance with some embodiments.

FIG. 6 is a flowchart of a method 600, in accordance with some embodiments. As shown, method 600 includes sampling 602 a data signal using a data sampler operating in a data signal processing path having a decision threshold associated with a DFE correction factor. Method 600 further includes measuring 604 an eye opening of the data signal by adjusting a decision threshold of a spare sampler operating outside of the data signal processing path to determine a center-of-eye value for the decision threshold of the spare sampler. The decision threshold of the spare sampler is initialized 606 based on the center-of-eye value and the DFE correction factor, and respective sets of phase-error signals are generated 608 for the spare sampler and the data sampler responsive to a detection of a predetermined data pattern. The decision threshold of the data sampler is subsequently updated 610 based on an accumulation of differences in phase-error signals of the respective sets of phase-error signals.

Some embodiments may include updating the decision threshold of the spare sampler responsive to the accumulation of differences in phase-error signals of the respective sets of phase-error signals prior to the updating of the data sampler. In some such embodiments, the decision threshold of the spare sampler is updated until the accumulation of differences in phase-error signals of the respective sets of phase-error signals is within a threshold, e.g., the number of differences in phase-error signals is below a predetermined percentage threshold for a given number of phase-error signals. In some embodiments, the method 600 further includes determining an offset correction value between the updated decision threshold of the spare sampler and the initialized decision threshold of the spare sampler. The decision threshold of the data sampler may then be updated using the determined offset correction value. In some embodiments, the decision threshold of the data sampler is updated by a single step in a direction determined by the offset correction value, while alternative embodiments may update the decision threshold of the data sampler is updated in a direction and magnitude determined by the offset correction value.

In some embodiments, the method 600 includes comparing the respective sets of phase-error signals to determine the accumulation of differences between the respective sets of phase-error signals. Such comparisons may be formed e.g., using logical XOR gates.

The differences between the respective sets of phase-error signals may be accumulated in a register. In some such embodiments, an LSB is updated in the register responsive to a determination of a difference between a pair of phase-error signals, each phase-error signal of the pair of phase-error signals selected from one of the respective sets of phase-error signals. The LSB may be updated in a direction determined by one phase-error signal in the pair of phase-error signals. In some embodiments, a set of higher-order MSBs of the register control the decision threshold of the spare sampler, and thus changes in the set of MSBs as a result of an imbalance of votes in the LSB cause the decision threshold of the spare sampler to change over time. A number of register positions separating the set of MSBs from the LSB may act as a low-pass filter such that the MSBs are gradually changed according to a larger number of updates to the LSB. While some embodiments may control the decision threshold of the spare sampler using the set of MSBs, it should be noted that alternative embodiments use the set of most significant bits (MSBs) of the register to directly control the decision threshold of the data sampler.

In some embodiments, each phase-error signal in each of the respective sets of phase-error signals is determined based on (i) a sample of the data signal and (ii) the predetermined data pattern.

In some embodiments, a method includes correct eye-scope offsets destructively first by measuring the top and the bottom of the eye of the data signal using the spare sampler and centering the decision threshold of the spare sampler vertically. Subsequently the decision threshold of the spare samplers in each sub-channel may be set equal to the +H1 value currently selected for that sub-channel. For each sub-channel, the decision threshold of the spare sampler is aligned in each phase with the corresponding data sampler by balancing the early-late votes between the two samplers. Balancing the early-late votes may be performed using an accumulation circuit, e.g., a counting register. Once the early-late votes are balanced, the decision threshold of the data samplers is equal to the decision threshold of the spare sampler and therefore, the decision threshold of the data sampler is calculated by subtracting the +H1 value from the offset of the spare sampler.

Subsequently the decision threshold of the spare samplers in each sub-channel are set equal to the −H1 value currently selected for that sub-channel, and for each sub-channel, the decision threshold of the spare sampler offset in each phase is aligned with the corresponding data sampler by again balancing the early-late votes between the two samplers to determine a correction offset of the spare sampler with respect to the data sampler. Once the correction offsets for both the +H1 and −H1 data samplers are known, the decision thresholds of the data samplers are updated together. In some embodiments, the update may be one step in a direction determined by the correction offsets, while alternative embodiments may include a magnitude component in the update.

I claim:
1. A method comprising:
   sampling a data signal using a data sampler operating in a data signal processing path having a decision threshold;
   initializing the decision threshold of a spare sampler based on a measured center-of-eye value;

generating respective sets of phase-error signals for the spare sampler and the data sampler responsive to a detection of a predetermined data pattern; and updating the decision threshold of the spare sampler in a direction responsive to an accumulation of differences in phase-error signals of the respective sets of phase-error signals; and updating the decision threshold of the data sampler based on the direction of updates to the decision threshold of the spare sampler.

2. The method of claim 1, wherein the decision threshold of the data sampler is based on a speculative decision feedback equalization (DFE) correction factor, and wherein the decision threshold of the spare sampler is further initialized based on the speculative DFE correction factor.

3. The method of claim 1, wherein the decision threshold of the data sampler is updated in a direction opposite of the direction of updates to the decision threshold of the spare sampler.

4. The method of claim 1, wherein the decision threshold of the spare sampler is updated until the accumulation of differences in phase-error signals of the respective sets of phase-error signals is within a threshold.

5. The method of claim 4, further comprising determining an offset correction value between the updated decision threshold of the spare sampler and the initialized decision threshold of the spare sampler.

6. The method of claim 5, wherein the decision threshold of the data sampler is updated based on the offset correction value.

7. The method of claim 1, wherein the decision threshold of the data sampler is updated by a single step.

8. The method of claim 1 wherein each difference in the accumulation of differences between the respective sets of phase-error signals is generated according to a comparison of the respective sets of phase-error signals.

9. The method of claim 1, wherein the differences between the respective sets of phase-error signals are accumulated in a register.

10. The method of claim 9, wherein a least significant bit (LSB) is updated in the register responsive to a determination of a difference between a pair of phase-error signals, each phase-error signal of the pair of phase-error signals selected from one of the respective sets of phase-error signals.

11. An apparatus comprising:
a data sampler operating in a data signal processing path having a decision threshold, the data sampler configured to sample a data signal;
a spare sampler operating outside of the data signal processing path having a decision threshold initialized based on a measured center-of-eye value;
the data sampler and spare sampler configured to generate respective sets of phase-error signals responsive to a detection of a predetermined data pattern; and
an accumulator configured to accumulate difference in phase-error signals of the respective sets of phase-error signals; and
a measurement controller configured to update the decision threshold of the spare sampler in a direction responsive to the accumulated differences in phase-error signals, and to further update the decision threshold of the data sampler based on the direction of updates to the decision threshold of the spare sampler.

12. The apparatus of claim 11, wherein the decision threshold of the data sampler is based on a decision feedback equalization (DFE) correction factor, and wherein the decision threshold of the spare sampler is further initialized based on the DFE correction factor.

13. The apparatus of claim 11, wherein the measurement controller is configured to update the decision threshold of the data sampler in a direction opposite of the direction of updates to the decision threshold of the spare sampler.

14. The apparatus of claim 11, wherein the measurement controller is configured to update the decision threshold of the spare sampler until the accumulation of differences in phase-error signals of the respective sets of phase-error signals is within a predetermined threshold.

15. The apparatus of claim 14, wherein the measurement controller is further configured to determine an offset correction value between the updated decision threshold of the spare sampler and the initialized decision threshold of the spare sampler.

16. The apparatus of claim 15, wherein the measurement controller is configured to update the decision threshold of the data sampler based on the offset correction value.

17. The apparatus of claim 11, wherein the measurement controller is configured to update the decision threshold of the data sampler by a single step in a direction determined by the offset correction value.

18. The apparatus of claim 11, wherein the accumulator is configured to compare phase-error signals in the respective sets of phase-error signals that are obtained at corresponding sampling instants to accumulate differences between the respective sets of phase-error signals.

19. The apparatus of claim 11, wherein the accumulator comprises a register configured to maintain the accumulation of differences between the respective sets of phase-error signals.

20. The apparatus of claim 19, wherein the register is configured to update a least significant bit (LSB) responsive to a determination of a difference between a pair of phase-error signals selected from the respective sets of phase-error signals.

* * * * *